United States Patent

Aho

[11] Patent Number: 5,683,004
[45] Date of Patent: Nov. 4, 1997

[54] STACKABLE AND UNSTACKABLE SUPPORT CONSTRUCTION

[75] Inventor: A. Stephen Aho, Davison, Mich.

[73] Assignee: Structural Plastics Corporation, Flint, Mich.

[21] Appl. No.: 653,944

[22] Filed: May 22, 1996

[51] Int. Cl.⁶ .................................................. A47F 5/00
[52] U.S. Cl. .................... 211/187; 211/133; 211/194; 211/188; 108/106; 108/144
[58] Field of Search .......................... 211/187, 133, 211/194, 126, 188; 403/354, 301, 302, 305, 300; 108/110, 106, 107, 144; 248/243

[56]  References Cited

U.S. PATENT DOCUMENTS

| 3,003,323 | 10/1961 | Holt | 403/301 X |
|---|---|---|---|
| 3,266,255 | 8/1966 | Dougherty | 403/301 X |
| 3,424,111 | 1/1969 | Maslow | 108/144 |
| 3,675,598 | 7/1972 | Kesilman | 108/144 |
| 4,467,927 | 8/1984 | Nathan | 211/153 |
| 4,551,118 | 11/1985 | Spisz | 403/354 X |
| 4,579,233 | 4/1986 | Hepp | 211/133 X |
| 4,595,107 | 6/1986 | Welsch | 211/187 |
| 4,627,543 | 12/1986 | Nicely | 211/187 |
| 4,628,625 | 12/1986 | Hepp | 211/194 X |
| 4,629,077 | 12/1986 | Niblock | 211/187 |
| 4,763,799 | 8/1988 | Cohn et al. | 211/187 |
| 4,799,818 | 1/1989 | Sudimak et al. | 211/187 X |
| 4,852,501 | 8/1989 | Olson et al. | 108/107 |
| 4,865,283 | 9/1989 | Parker | 211/133 X |
| 4,953,719 | 9/1990 | Spamer | 211/194 X |
| 5,037,084 | 8/1991 | Flor | 108/144 X |
| 5,127,342 | 7/1992 | Taylor | 211/187 X |
| 5,390,803 | 2/1995 | McAllister | 211/153 |

Primary Examiner—Robert W. Gibson, Jr.
Attorney, Agent, or Firm—Learman & McCulloch

[57] ABSTRACT

A vertically adjustable support has a plurality of vertically stackable and unstackable platforms, adjacent ones of the platform being joined by a coupling each of which extends downwardly from a socket in an upper platform in which the coupling is accommodated and has projections for gripping a portion of the next adjacent lower platform so as to join the upper and lower platforms in such manner as to minimize the inadvertent separation or slipping of adjacent platforms relative to one another.

22 Claims, 2 Drawing Sheets

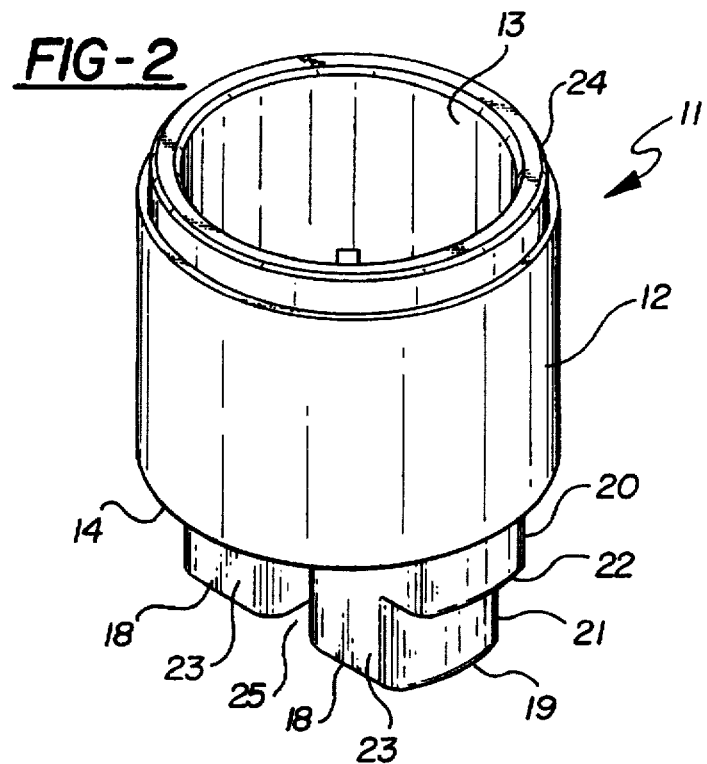
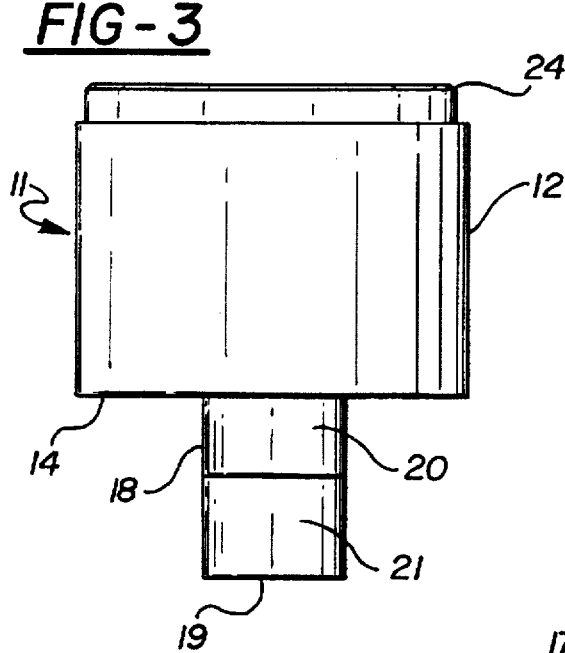
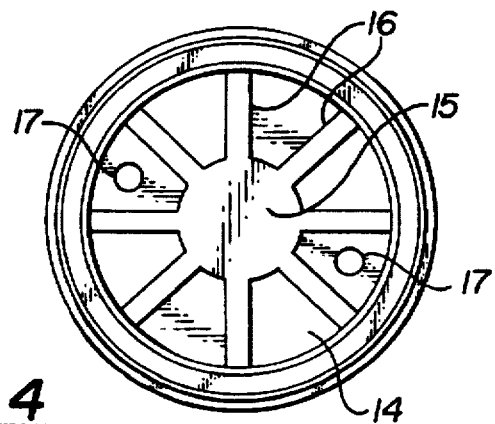

STACKABLE AND UNSTACKABLE SUPPORT CONSTRUCTION

This invention relates to a stackable and unstackable support construction wherein a plurality of platforms may be stacked in overlying relation and separably secured to one another. The invention also relates to a coupling member by means of which two platforms may be connected to one another in vertically stacked relation.

BACKGROUND OF THE INVENTION

Not all persons who operate machinery or other equipment necessitating the operator's standing during machine operations are of the same height. Most machines are so designed that a person of so-called average height may stand in a fairly erect, comfortable position during the performance of operations involving use of such machines. A person whose height is less than the average thus necessarily must occupy an ergonomically deficient position, thereby subjecting such person to undue discomfort and fatigue.

Various kinds of mats or platform-like devices have been proposed to enable a shorter person to be raised to a higher level during the performance of operations on a machine, but such mats and platforms have been less than desirable for a number of reasons. For example, such mats may be of different area and thickness, thereby making it difficult for a shorter worker to restore the overall height of the elevating mats to a predetermined level in the event the mats are removed between shifts to accommodate a taller person or if the mats are removed for cleaning purposes.

Another disadvantage of stacking mats and the like heretofore has been that any liquid discharged from the machine may be collected and absorbed by the mat, thereby resulting in a slippery and otherwise objectionable surface on which a person must stand. If the mats are formed of liquid absorbing materials, then the liquids themselves may cause rapid deterioration of the mats.

A principal object of the invention is to provide a vertically adjustable support construction which overcomes the disadvantages of the known prior art devices.

SUMMARY OF THE INVENTION

A variable height support constructed in accordance with the invention comprises a plurality of preferably uniform thickness platform members having upper and lower surfaces, the lower surfaces having a plurality of preferably uniform, correspondingly positioned sockets therein adapted for removable accommodation of coupling members. The coupling members preferably are uniform so that any one of them can be accommodated in any one of the sockets.

Each coupling member comprises a cylindrical body section open at one end and closed at its other end by a transverse wall. Fixed to and extending from the wall in prolongation of the body section is a pair of projections which are spaced apart from one another. The overall length of each coupling member is such that, when its body section is accommodated in a socket, the projections extend beyond the associated platform a distance sufficient to engage the next adjacent platform.

Each platform has a plurality of spaced apart ribs or partitions which together define an open grid construction for each platform. That part of each socket adjacent the upper surface of each platform is spanned by at least one cross bar, thereby providing a grid configuration across the upper end of each socket.

The space between the two projections of each coupling member corresponds substantially to the thickness of one of the cross bars which spans the socket, thereby enabling the projections of a coupling to extend beyond the lower surface of an upper platform member and straddle the cross bar which spans the socket of the next adjacent lower platform. Preferably, the space between the two projections of each coupling tapers or narrows toward the free ends of the projections, thereby enabling the projections frictionally to grip the cross bar and minimize inadvertent separation of one platform from another.

A ground engaging member preferably is provided for the lowermost platform and comprises a cylinder which may be accommodated in selected sockets of the lowermost platform. Preferably, each cylinder has at its lower end a skid-resistant surface to minimize inadvertent sliding of the platform relative to the surface on which it is supported.

The grid configuration of each platform enables any spilled liquids or small metal or other parts to fall through the platform, thereby avoiding the buildup of liquids and other foreign matter on the upper surface of the support. Preferably, the transverse wall at the closed end of each of the body sections of the couplings also has openings therein through which liquids may drain.

THE DRAWINGS

The invention is disclosed in the accompanying drawings, wherein:

FIG. 2 is an enlarged, isometric view of a coupling;

FIG. 3 is a side elevational view of the coupling; and

FIG. 4 is a top plan view of the coupling.

THE PREFERRED EMBODIMENT

Figure 1:
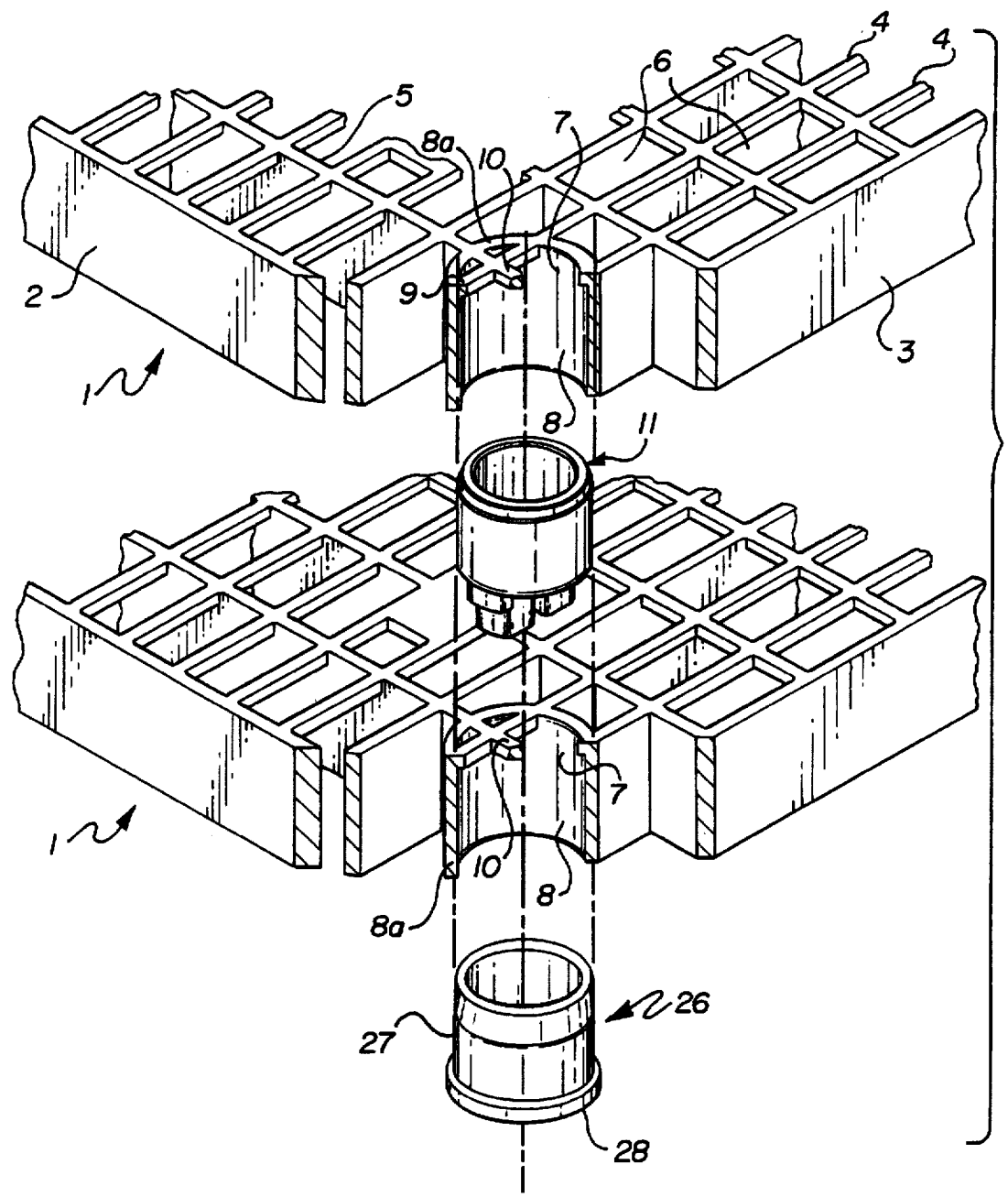
FIG. 1 is a fragmentary, exploded, isometric view of two typical platform members and a coupling for joining them to one another, the figure also including a support member.

The presently preferred embodiment of the invention is illustrated in the drawings and comprises a plurality of square, rectangular, or other suitably shaped platforms 1 each of which has opposite end walls 2 joined by opposite side walls 3 and a plurality of longitudinally and transversely extending ribs 4 and 5, respectively, which form a grid having a plurality of spaces 6 therein. Each platform 1 preferably is molded of a suitable plastic having sufficient strength to support a person and which is substantially inert to oils and other liquids to which it may be subjected in the environment of its use.

At suitably spaced intervals each platform has at its lower side a cylindrical socket 7 having a smooth bore 8 and an annular wall 8a. The number and spacing of such sockets should be sufficient to enable each platform to be supported in a stable, horizontal position by a support member yet to be described. At its upper end the socket 7 is spanned by continuations of the ribs 4 and 5 to form a grid of cross bars 9 and 10 integrally formed with the remainder of the platform. The cross bars 9 and 10 span the upper end of the platform, but the opposite or lower end of the socket 7 is open. One of the cross bars, 10, extends diametrally of the socket.

A single platform 1 may be placed in such position as to support a worker at a machine operated or attended by such worker. Such platform provides adequate support for the worker and the open grid construction of the platform enables any small objects or spilled liquids to pass through the platform, rather than collect on the upper surface thereof.

Not all workers are of such height as to be able to assume a comfortable, non-tiring position alongside the machine that such worker is operating or attending. Accordingly, provision is made to enable at least one, and preferably more, like platforms to be stacked and retained in overlying relation with one another. It is important that the stacked platforms be immovable relative to one another so as to avoid the possibility that a person stepping onto or leaving the stacked platforms causes the stacked platforms to shift relative to one another.

The apparatus includes coupling means 11 for connecting adjacent, vertically stacked platforms 1 to one another. Each coupling is identical and comprises a cylindrical body section 12 having a smooth inner bore 13, the body section 12 being open at its upper end and closed at its lower end by a transverse wall 14. The inner surface of the wall has integrally formed therewith an upstanding hub 15 from which ribs 16 radiate. The hub and ribs strengthen the wall 14. To provide drainage through the coupling 11 the wall 14 has one or more drain openings 17 formed therein.

Secured to and extending from the outer surface of the wall 14 in prolongation of the body section 12 is a pair of projections 18, each of which terminates in a free end 19. Each projection 18 preferably is hollow to provide some flexibility of the projections for a purpose presently to be explained.

Each projection has adjacent its wall 14 an enlarged, outwardly arcuate portion 20 that is joined to a reduced end portion 21, the portions 20 and 21 being separated by a shoulder 22. Each side of each projection 18 has a flat surface 23.

Preferably, the outer surface of the body section 12 adjacent the free end is reduced in size, as shown at 24, which facilitates insertion of the body section into a socket 7.

To assemble a pair of platforms 1 in overlying relation, the upper platform is raised to enable a coupling 11 to be accommodated in selected sockets 7 of the upper platform. The overall height of the body section 12 preferably corresponds substantially to the height of the socket 7 so that, when the open end of the body section 12 abuts the cross bars 9 and 10, the projections 18 extend below the lower surface of the platform in which the coupling is mounted. The extent to which the projections 18 extend beyond the lower surface of the upper platform 1 is sufficient to enable the two projections to pass and straddle the diametral cross bar 10 of the adjacent lower platform 1, the cross bar 10 being accommodated in a space 25 provided between the two extensions 18.

The radius on which the arcuate surface 21 of each projection is formed preferably is less than the radius on which the socket bore 8 is formed, but the radius on which the enlarged portion 20 of each projection is formed corresponds substantially to the radius of the bore 8 of the socket thereby enabling the enlarged portions 20 of the projections to provide lateral stability for the associated coupling when the coupling is assembled with the platform. The flat surfaces of the projections 18 enable the reduced portion of each projection to pass between parallel cross bars 9 at the upper end of the socket 7 of the lower platform.

The height of the space 25 corresponds to the full length of each projection 18, thereby enabling the outer surface of the transverse wall 14 at the closed end of the body section 12 to seat on the upper surface of the cross bar 9 and 10 which span each socket 7.

Preferably, the space 25 between the adjacent projections 18 has a width corresponding substantially to the thickness of the cross bar 10, but tapers toward the free ends 19 of the projections by one or two degrees. The material from which the projections is formed has sufficient resilience to enable the projections to flex, and the flexibility of the projections is enhanced by the hollow construction thereof. The taper enables the diametral cross bar 10 to deflect the projections away from one another as the cross bar 10 moves into the space 25, and the resilience of the projections enables the cross bar to be gripped by the projections when the cross bar 10 is accommodated between the projections, thereby minimizing the likelihood of inadvertent separation of the coupling from the lower platform 1.

It is preferred that a ground engagable support be provided for each socket 7 of the lower platform 1. Such support as indicated at 26 and comprises a hollow cylinder 27 open at its upper end and provided at its lower end with a rubbery or other suitable cap 28 which provides an anti-skid surface for the lower end of the cylinder 27. The overall height of the cylinder 27 is such that the latter may be accommodated in any one of the sockets 7 with its upper end abutting the cross bars 9 and 10 and with its non-skid cap 28 projecting slightly beyond the lower surface of the lower platform 1. The supports 26 enable the lowermost platform to occupy a horizontal position.

The length and width of each platform should be sufficient to enable it to provide adequate space in which a person may stand and move to the extent necessary to operate or attend a particular machine. It is possible, of course, to have a lowermost platform of relatively great length so that upper platforms of shorter length may be supported atop the lower platform with spaces between the shorter platforms. It also is possible for the areas of upper and lower platforms to be the same.

The disclosed embodiment is representative of the presently preferred form of the invention, but is intended to be illustrative rather than definitive thereof. The invention is defined in the claims.

I claim:

1. A coupling for connecting two platforms to one another in vertically stacked relation, at least one of said platforms having at least one vertically extending socket for the accommodation of said coupling, said socket being open at one end thereof and having at least one cross member spanning said socket at the opposite end thereof, said coupling comprising a body section having a cross-sectional configuration corresponding to that of said socket and of such transverse dimensions as snugly to be accommodated in said socket, at least one projection joined to and extending in prolongation of said body section, said projection being of such transverse dimension as to pass said cross member, said coupling having an overall length such as to enable said projection to extend beyond one of said platforms in a direction toward the next adjacent one of said platforms when said body section is seated in said socket, said body section having a transverse wall at the juncture of said body section and said projection, and said transverse wall having at least one drainage opening therein.

2. The coupling according to claim 1 including two of said projections extending alongside one another and separated by a space of such width as to accommodate said cross member.

3. The coupling according the claim 2 wherein said space tapers.

4. The coupling according to claim 1 including a support member of such dimension and configuration as to be accommodated in said socket and enable one end thereof to extend beyond said socket in a direction away from said next adjacent one of said platform.

5. The coupling according to claim 4 wherein said one end of said support has a skid-resistant external surface.

6. The coupling according to claim 1 wherein said wall includes reinforcing ribs.

7. In combination, at least one coupling and two substantially planar platforms connected to one another by said coupling in vertically stacked abutting relation, each of said platforms having a plurality of vertically extending cylindrical sockets, each of which may accommodate said coupling, each of said sockets being open at one end thereof and having at least one cross member at its opposite end extending diametrically across said socket, said coupling comprising a cylindrical body section accommodated snugly in an associated one of said sockets and terminating at one end in a transverse wall, a pair of projections joined to and extending beyond said wall in prolongation of said body section, said projections terminating in free ends remote from said wall and being of such length and being separated by a space of such dimension as to enable the free ends of said projections to extend beyond the platform of the socket in which said body section is accommodated in a direction toward the adjacent platform and to straddle an associated cross member of said adjacent platform to provide said abutting relation of said platforms while restraining said platforms against relative lateral movements.

8. The combination according to claim 1 including a support member accommodated in said socket having one end thereof extending beyond said socket in a direction away from said adjacent platform.

9. The combination according to claim 8 wherein said one end of said support member has a skid-resistant external surface.

10. A stackable and unstackable support comprising a plurality of overlying platforms, and connecting means separably joining said platforms to one another, each of said platforms comprising a substantially flat body member having side walls joined by partitions forming grids, each of said body members having a plurality of correspondingly positioned sockets open at one end and spanned at its opposite end by at least one cross bar, said connecting means comprising a plurality of coupling members each of which has a body section snugly accommodated in a selected one of said sockets, a pair of side-by-side projections extending from one end of said body section and being spaced apart a distance to straddle the cross bar at the opposite end of said selected one of said sockets, said projections terminating in free ends and being of such length as to extend beyond the platform in which it is accommodated in the direction of the adjacent platform so as to straddle the cross bar of the corresponding socket of said adjacent platform, the spacing between said projections being such that said projections forcibly but releasably grip the cross bar of said corresponding socket of said adjacent platform.

11. The support according to claim 10 wherein the platforms are so arranged that the open end of each of said sockets faces downwardly.

12. The support according to claim 11 wherein selected ones of said sockets of the lowermost one of said platforms has a ground engageable support therein, each of said supports having a skid resistant surface at its lower end.

13. The support according to claim 10 wherein the space between each pair of said projections tapers in the direction of the free ends of said projection.

14. The support according to claim 10 wherein said body section of each of said couplings terminates in a transverse wall from which said projections extend in prolongation of said body section.

15. The support according to claim 10 wherein each of said sockets is cylindrical and the body section of each of said couplings is cylindrical.

16. The support according to claim 15 wherein the projections of each of said couplings are aligned with one another diametrally of the associated body section and spaced radially inward from the periphery of said associated body section.

17. The support according to claim 16 wherein each of said projections has an enlargement between the free end of such projection and said body section, said enlargement having an external, arcuate surface formed on a radius corresponding to that of said socket.

18. A coupling for connecting two platforms to one another in vertically stacked, abutting relation wherein each of the platforms has at least one cylindrical socket that extends vertically and is open at one end and wherein at least one of the sockets is spanned at its opposite end by a cross member, said coupling comprising: a cylindrical tubular body section having an outer diameter of predetermined dimension for snug accommodation within the socket of one of the platforms, said body section being closed at one end by a transverse end wall having an outer diameter no greater than that of said body section, a pair of side-by-side projections extending from said transverse end wall in prolongation of said body section and terminating in free ends, said projections being separated by a space that extends the full length of said projections from said transverse wall to said free ends and is of such width as to accommodate the cross member of the other platform between said projections and to bring said transverse wall into abutting engagement with the cross member to permit the platforms to be stacked in abutting engagement with one another.

19. The coupling of claim 18 wherein said space is tapered in the direction of said free ends.

20. The coupling of claim 18 wherein said free ends of said projections are reduced in dimension.

21. The coupling of claim 18 wherein said body section includes internal reinforcement ribs adjacent said end wall.

22. The coupling of claim 18 wherein said end wall has at least one drainage opening therein.

* * * * *

UNITED STATES PATENT AND TRADEMARK OFFICE
CERTIFICATE OF CORRECTION

PATENT NO. : 5,683,004
DATED : November 4, 1997
INVENTOR(S) : A. Stephen Aho

It is certified that error appears in the above-indentified patent and that said Letters Patent is hereby corrected as shown below:

Claim 8, line 1, change "1" to -- 7 --.

Signed and Sealed this

Twenty-seventh Day of January, 1998

*Attest:*

BRUCE LEHMAN

*Attesting Officer*  *Commissioner of Patents and Trademarks*